Aug. 15, 1961 J. M. ROBERTI ET AL 2,996,650
SERVOSYSTEM WITH DAMPING WHICH DECREASES WITH SERVOMOTOR SPEED
Filed May 12, 1959 3 Sheets-Sheet 1

JOSEPH M. ROBERTI
VINCENT V. ROBERTI
INVENTORS

BY

ATTORNEYS

Joseph M. Roberti
Vincent V. Roberti
INVENTORS

ATTORNEYS

JOSEPH M. ROBERTI
VINCENT V. ROBERTI
INVENTORS

BY

ATTORNEYS

United States Patent Office 2,996,650
Patented Aug. 15, 1961

2,996,650
SERVOSYSTEM WITH DAMPING WHICH DE-CREASES WITH SERVOMOTOR SPEED
Joseph M. Roberti, Newark, and Vincent V. Roberti, Oakland, N.J., assignors to General Precision, Inc., a corporation of Delaware
Filed May 12, 1959, Ser. No. 812,772
22 Claims. (Cl. 318—448)

This invention relates to servo motors used in conjunction with positional servo systems, and is particularly directed to a small servo motor fitted with a drag cup to react with a floating rotatably mounted permanent magnet to develop a damping factor which varies relatively inversely as the speed of rotation of the drag cup and motor.

This invention is directed to an improvement on Patent No. 2,770,743 issued by the United States Patent Office to Bernard M. Wallach, on the 13th day of November, 1956, on a "Servo System With Built-in Damping Action," and assigned to the assignee of the present invention.

The invention consists of a movable and variable magnetic flux field system for developing a variable flux field across an air gap within which a drag cup is rotated. The reaction between the drag cup and the magnetic flux system serves to vary the strength of the flux field in the gap, so the drag of the flux field on the cup will vary as an inverse function of the speed of the drag cup.

The magnetic system comprises a permanent magnet, shown for simplicity as two-pole, supported for limited free angular movement around a main axis of the motor. A magnetic keeper with two polar elements provides a return flux path for the permanent magnet. At the normal neutral position of the permanent magnet, the polar elements of the keeper are aligned radially with, and spaced a minimum distance from, the pole ends of the permanent magnet to define an air gap for the drag cup.

As the drag cup rotates in the gap and cuts the magnetic flux across the air gap, current is induced in the cup as a function of the rate of cutting of the flux lines, and a secondary flux field results from such current that causes a reaction or resistance to the cup movement that is a function of the rate of cutting of the flux lines across the gap. The secondary flux field then sets up a magnetic torque reaction between the cup and the magnet that tends to turn the magnet with the cup in the direction of rotation of the cup. That torque reaction against the magnet is a function of the secondary flux field and of the speed of the cup. Thus, as the cup speed increases, the magnet is angularly displaced further from neutral position. The pole faces of the magnet are thereby moved farther away from the polar elements of the keeper, with a resulting continuing reduction in the flux density in the air gap, and with a corresponding reduction in the inductive drag reaction by the gap flux on the cup, as the magnet is turned farther and farther from its normal neutral position of minimum spacing. The angular movement of the magnet from normal neutral position increases the gap between the keeper poles and the magnet poles, and causes the flux gradient across the gap to shift from a radial direction to a direction having a major tangential component.

Therefore the inductive reaction against the cup is reduced due to reduction of the flux gradient component in the radial direction transverse to the moving cup body.

The increased cup speed, however, increases the reaction torque against the magnet even though the reaction drag on the cup is at the same time being reduced.

The permanent magnet is supported to be angularly rotatable through an angular range limited by specifically positioned stops which limit the maximum angular movement of the magnet.

The drag cup is preferably made of a non-magnetic metal, such as aluminum, and is so shaped as to extend into the air gap between the poles of the keeper and those of the permanent magnet.

A feature of the invention is that the floating permanent magnet is trunnioned on a separate shaft co-axially aligned with the motor drive shaft so that the magnet may rotate independently of the motor drive shaft.

A primary object of the invention is to provide a damping unit which is directly co-ordinated with the motor structure, and in which the damping action varies as a desired function of the speed of rotation of the motor, provision being made to permit the assembly of a unit with different damping action without affecting the primary motor construction.

In general, with a constant flux across the air gap, the damping action would vary as the speed of rotation of the servo motor. When the poles of the permanent magnet are in substantial radial alignment with the poles of the keeper or return path, the magnetic flux is at a peak, and, therefore, the damping action is at a maximum.

However, as the angle between the magnet poles and the poles of the keeper is increased, the effective magnet flux is progressively reduced and the angle at which the flux is cut by the drag cup is correspondingly reduced, with the result that the damping or drag action is reduced on the cup.

The invention is shown embodied in a servo motor which carries and rotates an associated hollow cylindrical drag cup of a non-magnetic highly conductive material through a magnetic field. The magnetic field is established across an air gap between a rotatable permanent magnet and a stationary magnetic structure serving as a keeper or return path for the permanent magnet. The magnet is rotatably supported on an auxiliary shaft co-axially aligned wth the motor shaft and is disposed in the space within the drag cup. A plurality of stops, suitably positioned, limit the angular movement of the permanent magnet from its normal neutral position in alignment with the poles of the keeper.

The keeper, of magnetic material, is provided with a plurality of diametrically opposite salient poles corresponding with the number and relation of the poles of the permanent magnet, the keeper poles being adjacent the outer periphery of the drag cup.

The accompanying drawings, illustrative of one embodiment of the motor and damping unit construction, together with the description of the construction and the method of operation and functioning of the motor damping unit, will serve to clarify further objects and advantages of the invention.

It will be understood that the following description of the construction and of the method of operation and utilization of the servo motor with built-in damping mechanism, is intended as explanatory of the invention and is not restrictive thereof.

In the drawings, the same reference numerals designate the same parts throughout the various views.

Figures 1, 10:
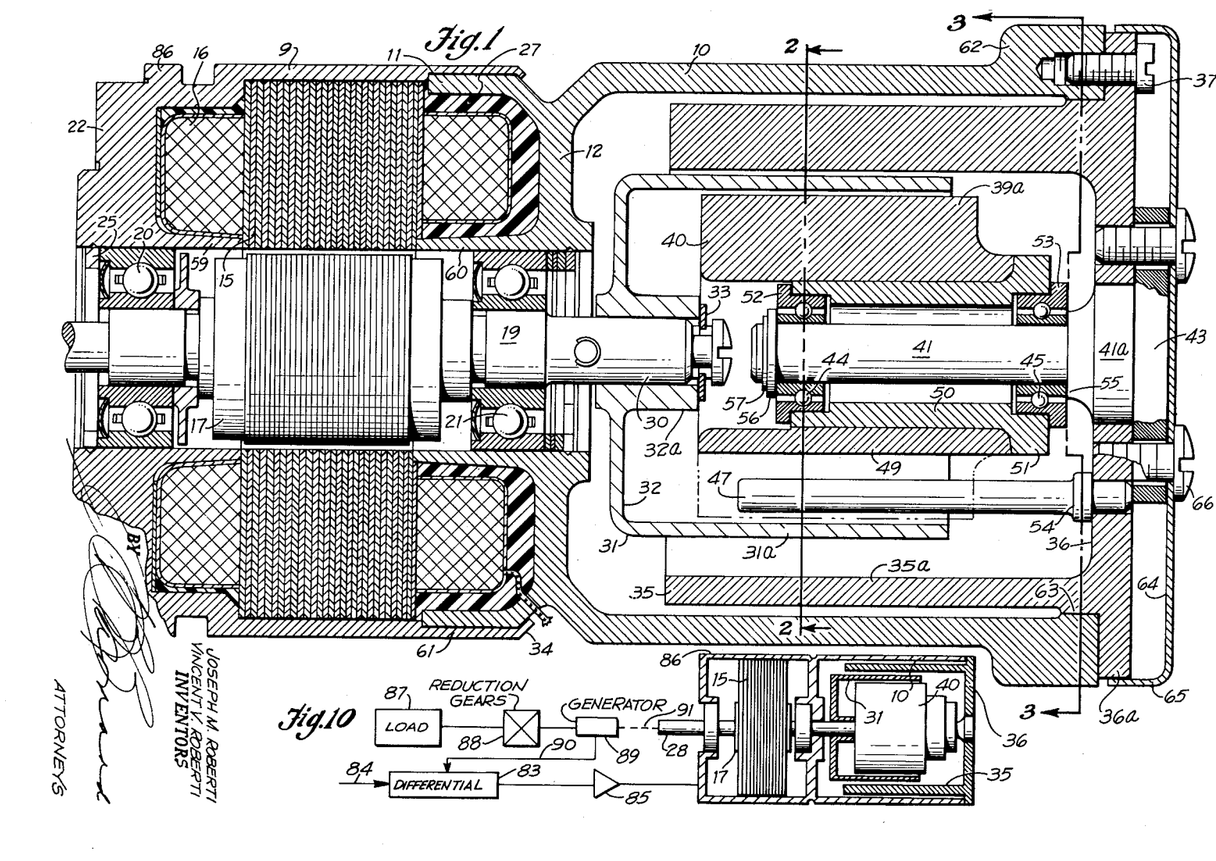
FIGURE 1 is a longitudinal sectional view of one embodiment of the servo motor construction, showing the drag cup mounted on the motor shaft, the permanent magnet mounted on an auxiliary shaft co-axially aligned with the motor shaft, and the keeper or return path supported by an extension of the stator housing.
FIGURE 10 represents a block diagram of a positioning servo loop including schematically the servo motor and damping mechanism combination shown in FIGURE 1, in combination with the other elements comprising the servo loop.
Figures 2, 3, 7, 9:
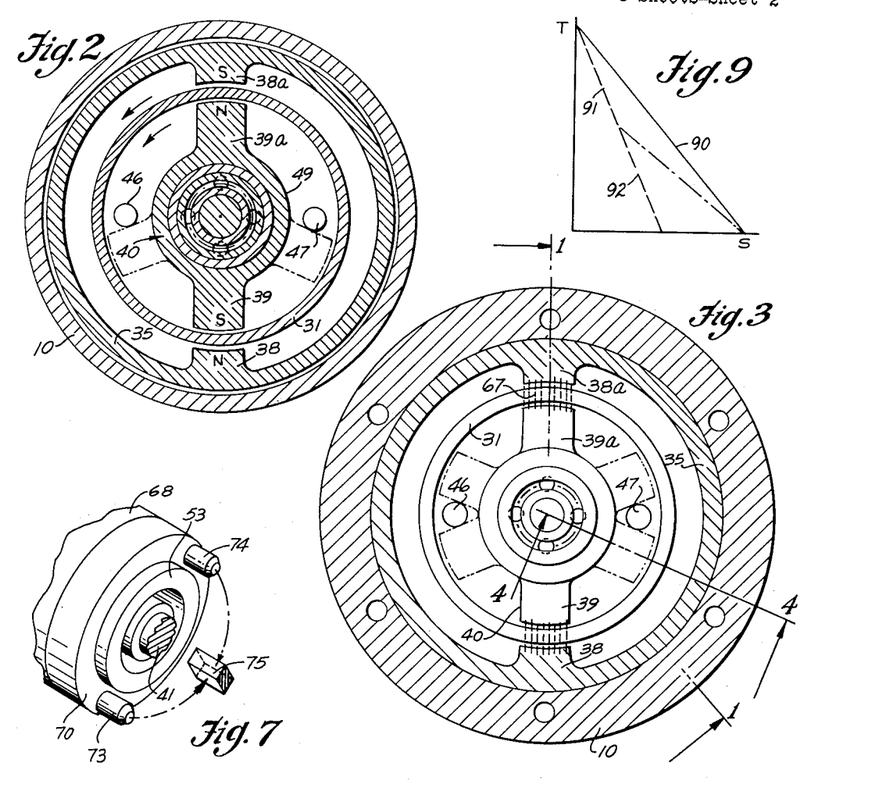
FIGURE 2 is a cross-sectional view through the damping apparatus of the servo motor shown in FIGURE 1, taken on the line 2—2, FIGURE 1, showing the stops which limit the angular movement of the permanent magnet, with the magnet moved to the maximum angular position in both directions shown in dot-dash lines.
FIGURE 3 is a cross-sectional view, similar to FIGURE 2, through another portion of the damping apparatus of the servo motor shown in FIGURE 1 with the permanent magnet moved to its maximum angular position in both directions, shown in dot-dash lines, taken on the line 3—3, FIGURE 1.
FIGURE 7 is a schematic perspective view of one end of the cylindrical permanent magnet shown in FIGURES 5 and 6 and the flanged bushing supporting the permanent magnet, with a pair of stop pins projecting beyond the flange of the bushing, and a stop operative to limit the angular movement of the stop pins.
FIGURE 9 shows a series of curves, comparing the speed-torque relation of the conventional type of servo motor with that of the servo motor equipped with a built-in damping action, and a servo motor equipped with another type of damping mechanism.

In one embodiment of the invention, shown in FIGURES 1, 2 and 3, the servo-motor comprises a motor and a damping mechanism. The motor is mounted in a front cylindrical housing 9 and the damping mechanism is disposed in a rear co-axially aligned housing 10. The rear housing 10 embodies an extension 11 which is anchored on the rear portion of the motor housing 9.

The rear housing 10 is also provided with an integral wall 12, that is substantially perpendicular to the common longitudinal axis of the two housings, and that supports a bearing cylinder for the motor shaft.

The axial extension 11 from the housing 10 and wall 12 fits snugly into the rear of the front housing 9 and is locked in position by the rim 34 of the housing 9 which is spun over extension 11, as shown.

The damping mechanism proper is separately mounted and supported from a suitable end plate on the outer end of the rear housing 10.

The motor consists of a stator core 15, composed of a plurality of circular laminations with suitable slots for accommodating stator windings 16, and a rotor element 17 on the main motor shaft which is provided with two co-axial journals 18 and 19 respectively supported in two anti-friction bearings 20 and 21.

The anti-friction bearing 20 is supported in the outer end wall 22 of the motor housing 9, and the bearing 21 is supported in the central separator wall 12 of the housing 10. The anti-friction bearings are held in place longitudinally by suitable snap ring assemblies 25 and 26, respectively, which are individually axially located and held in grooves cut into the inner surface of the tubular hubs of the motor housing and of the separator wall 12, as shown in FIGURE 1.

The stator windings 16 are insulated from the housing 9 and the extension 11 of housing 10 by a thermosetting plastic material 27, which is poured into the space between the windings and the housings. One plastic material suitable for this purpose is obtainable and known commercially as Araldite.

The forward rotor journal 18 at the front end of the motor projects beyond the bearing 20 to serve as a drive shaft 28 for the motor. The rear motor journal 19 at the rear end of the rotor shaft has an integral extension which serves as a tab shaft 30 to support and drive a cylindrical drag cup 31, which consists of a cylindrical body 31a, an annular hub wall 32, and a supporting hub 32a. The hub 32a is fitted to the rotor stub shaft 30, and locked in place by a lock-washer and bolt assembly 33.

The rotor stub shaft 30 and the body 31 of the damping or drag cup extend beyond the central separator wall 12 into the rear housing 10.

The drag cup 31 is made of a non-magnetic highly conductive material, such as an aluminum alloy. It extends into and rotates in an air gap between a permanent magnet 40 and its keeper 35. The keeper 35 consists of a coaxial hollow cylindrical laminated steel body 35a and a transverse end wall 36. The shell body of the keeper 35 surrounds the body of the drag cup 31. The end wall 36 of the keeper 35 has a peripheral flange 36a which abuts the rear end rim face of the housing 10, and is attached thereto by a plurality of bolts 37, to support the body of the keeper 35 in firm position relative to the axis of the servo motor.

Figure 4:
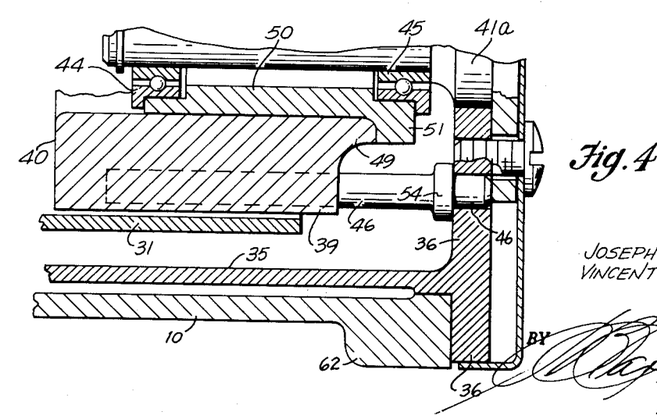
FIGURE 4 is a longitudinal section through a portion of the damping apparatus of the servo motor shown in FIGURE 1, showing the relation of one of the stop pins to the permanent magnet and the method of supporting the stop pin, which limits the angular movement of the permanent magnet, taken on the line 4—4, FIGURE 3.

As shown in FIGURES 3 and 4, the keeper 35 has a pair of diametrically opposite salient poles 38 and 38a integral therewith and projecting radially inward therefrom, the poles being aligned with the opposite poles 39 and 39a of a permanent magnet 40 angularly movable within the drag cup.

To support the magnet 40, a cylindrical auxiliary shaft 41 is provided, having a pilot 41a integral therewith and fitting into an opening in the rear wall 36 that also supports the keeper 35. The auxiliary shaft 41 serves as a support for a pair of spaced ball bearings 44 and 45 which are fitted to the interior of a rotatable bushing 50 to which the permanent magnet 40 is fixed so the magnet may be angularly movable on the auxiliary shaft 41. The limits of such permitted angular movement are established by a pair of cylindrical stop pins 46 and 47.

The auxiliary shaft 41 is a longitudinally co-axially aligned with the stub shaft 30 of the motor rotor, thereby assuring rotation of the permanent magnet 40 and of the drag cup 31 about the same common axis of the motor.

The permanent magnet 40 is made of Alnico, or other suitable magnet material, and consists of a central body 49 of cylindrical form (FIGURES 1 and 2) having a circular bore therethrough, with a pair of diametrically opposed poles 39 and 39a of rectangular cross-section projecting radially outward from the central body 49. When the magnet is in neutral position, the poles 39 and 39a are substantially in radial alignment with the salient poles 38 and 38a of the keeper 35. The width of the two sets of paired poles may be the same or otherwise related to predetermine the gap flux density and distribution.

In the drawings FIGURES 2 and 3, the distance between the extreme radial end face of the pole 39 or 39a of the permanent magnet and the adjacent radial surface of the associated salient pole 38 or 38a of the keeper constitutes the air gap between each magnet pole and the corresponding keeper pole. The clearances between the drag cup and the poles are relatively small. The wall thickness of the drag cup may be as small as possible, consistent with mechanical strength to withstand torque and twisting stresses.

The tubular bushing 50 that supports the permanent magnet 39 has a circular flange 51 integral with one end thereof to position one end of the magnet. The ends of the bushing 50 are counterbored as shown in FIGURE 1, to receive the outer races of the supporting ball bearings 44 and 45, which are shown with locating flanges 52 and 53 integral with the outer races of these ball bearings abutting the ends of the tubular bushing 50.

In order to reduce the fluctuations in angular movement of the permanent magnet to a minimum, a damping fluid in the form of a relatively heavy lubricating oil, or other suitable damping fluid of preselected viscosity may be introduced into the ball bearings 44 and 45 supporting the permanent magnet on the auxiliary shaft, the damping fluid introducing an additional damping action which serves to stabilize the angular movement of the permanent magnet and reduce to a minimum the angular fluctuations thereof.

As shown in FIGURE 4, the stop pins 46 and 47, to limit the angular movement of the magnet, are fixedly attached to the rear supporting wall 42 for the keeper, each of the stop pins having a cylindrical mounting section at the rear end thereof, which is pressed into or otherwise anchored on the supporting wall 42. Each stop pin 46 or 47 has a shoulder 54 to longitudinally locate the stop pin in its operative position.

The stop pins 46 and 47 are positioned a predetermined angular distance from the keeper poles, such as to permit the side faces of each of the permanent magnet poles 39 and 39a to be angularly displaced through a maximum angle of approximately 75°, on either side, from initial neutral position of the magnet corresponding to alignment with the keeper poles. While the stop pins allow such range of angular movement of the magnet poles, the usual operating range of the angular movement of the permanent magnet is usually less than 45° to either side.

The limitations of the angular movement of the permanent magnet may be varied and the position of the stop pins 46 and 47 altered accordingly, in order to limit the angular movement of the permanent magnet, in conformity with the requirements of a particular servo motor unit, the angular range of movement of the permanent magnet being co-ordinated to some extent with the operating speed of the rotor and the drag cup attached thereto.

For stable support of the magnet, the inner races of the ball bearings 44 and 45 are longitudinally spaced on the auxiliary shaft 41. A shoulder 55 integral with the pilot 41a, at the rear end of the auxiliary shaft 41, locates bearing 45 in conjunction with the flange 51 of the bushing 50. At the forward end of the auxiliary shaft 41, the forward ball bearing 44 is held in place between a shoulder on bushing 50 and a tubular spacer 56 fitted onto shaft 41, with a snap ring 57 fitted onto the auxiliary shaft 41 to brace the spacer 56.

The permanent magnet body 39 is preferably fixedly attached to the tubular bushing 50 by means of a suitable metallic cement to avoid mechanical stresses on the magnet.

As shown in FIGURE 1, the outer end wall 22 of the forward motor housing 9 has an internal tubular hub 59 integral therewith, the hub receiving and supporting the outer race of the ball bearing 20. A similar tubular hub 60 is intergral with the central separator wall 12 of the rear housing 10 and supports the rear ball bearing 21.

The junction between motor housing 9 and rear housing 10 is established by the extension portion 11 of the rear housing fitting into a rear section 61 of motor housing 9, with the rim edge of section 61 spun or peened over extension 11.

In order to support the rear flange 36a for the keeper 35, several bosses 62 are spaced around the rear rim edge of the rear housing 10, and are internally threaded to receive the bolts 37 which clamp the keeper flange 36a to the housing 10. A co-axial cylindrical outer guide surface 63 is formed around the rear end of the keeper body adjacent the flange 36, so the keeper may be accurately co-axially fitted into housing 10.

A thin dished cap 64 is fitted over the edge of the flange 36a of the end wall 36, a circular wall 65 of the cap 64 engaging the outer circumference of the flange 36a to close the rear end of the housing 10. The cap 64 is secured to the wall 36 by several screws 66 extending through a spacer 43 that spaces the cap 64 from the wall 36 to accommodate the heads of bolts 37.

The operation of the damping apparatus is substantially as follows:

When the motor is stationary, the permanent magnet will assume substantially the position shown in FIGURES 1, 2 and 3, with the poles 39 and 39a of the permanent magnet aligned with the opposed poles 38 and 38a of the keeper 35 that provides the return path for the flux lines 67 from one pole to the other of the permanent magnet through the two air gaps between the magnet poles and the keeper poles.

When the drag cup is rotated through the two air gaps by the rotor shaft, two actions take place. First, the lines of magnetic force from the permanent magnet induce a current in the drag cup, which in turn sets up a magnetic field therein that reacts against the field of the magnet. A retarding force is thereby established on the drag cup. However, depending upon the energy being supplied to the servo motor, the motor will overcome such retarding force on the cup, and will drive the cup. At the same time, a forward reaction force is set up by the field induced in the cup working against the magnetic field of the permanent magnet. That reaction force tends to angularly displace the permanent magnet from the aligned position shown in FIGURES 2 and 3 to some position between neutral and one of the angularly displaced positions shown by dot-dash lines, FIGURE 3.

Until the angular displacement of the permanent magnet is great enough to cause it to engage the stop pin 46 as shown in FIGURE 3, the permanent magnet will be displaced through an angle at which the displacement torque developed in the permanent magnet by the interaction of the two sets of magnetic lines of force is balanced by an equal magnetic force of attraction between the poles of the permanent magnet and the poles of the keeper, which tends to align the magnet poles with those of the keeper and to restore the permanent magnet to its initial position shown in FIGURES 2 and 3.

When the poles of the permanent magnet are in radial alignment with the opposed poles of the keeper, the magnetic flux through the circumferential wall of the drag cup is at a maximum, thus inducing a current of maximum strength in the drag cup and providing a maximum damping action against the cup.

When the permanent magnet is displaced through an angle of approximately 75° on either side, to substantially the position shown by dot-dash lines in FIGURES 2 and 3, the transverse component of the density of the flux field across the gap is reduced and the counter-torque or retarding force against the drag cup is therefore relatively small.

This condition of small counter-torque occurs at relatively high speeds, since at higher motor speeds greater aggregate induction reaction occurs between the drag cup and the magnet, and consequent displacement of the magnet shifts the magnet flux field more towards tangential position relative to the cup. In such position of the magnet flux field, the transverse component of the flux density is diminished.

The relation between the speed of the motor and the torque generated thereby, as well as the influence of the damping mechanism on the speed-torque relationship and the consequent effect of the damping action on the speed-torque relationship, is shown in the curves shown in FIGURE 9.

The degree of damping action obtainable in a particular motor construction can be predetermined and varied to suit the requirements of a particular application. These variations in damping effect are shown to some extent in the curves shown in FIGURE 9.

In order to vary the damping action, the width of the poles of the keeper and the width of the poles of the permanent magnet may be varied, to vary the magnet flux and flux density across the air gap at neutral position of the magnet.

In the same manner, the overall damping action may be varied by changing the strength of the magnetic circuit, including the permanent magnet and the keeper.

The stop pins 46 and 47 are provided in order to limit the angular movement of the permanent magnet preferably to approximately 75° in either direction, but absolutely to a maximum angular displacement of approximately 90° in either direction.

Figure 5:
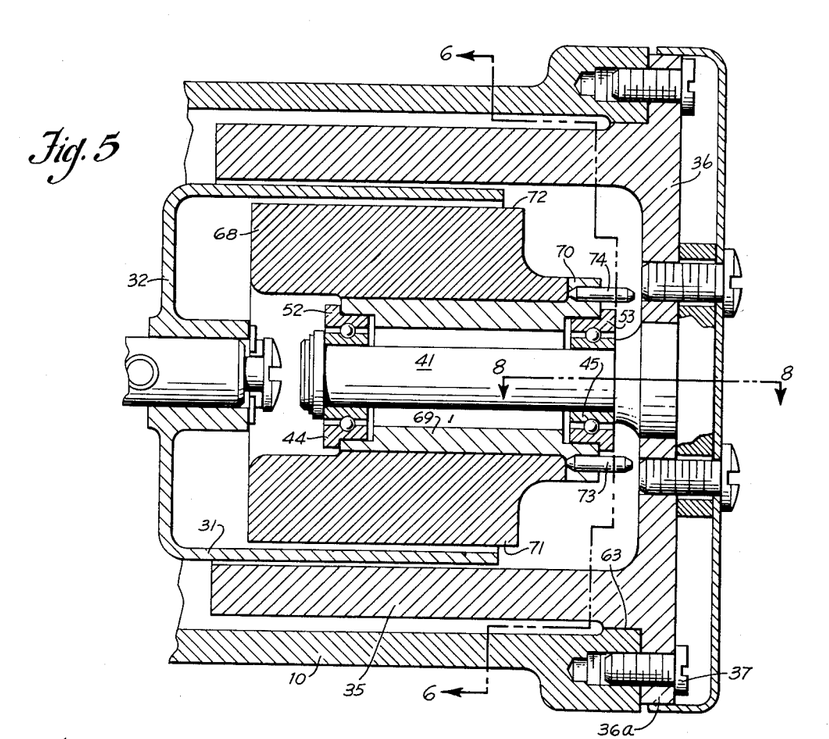
FIGURE 5 is a longitudinal sectional view, similar to FIGURE 1, through a modification of the damping mechanism construction shown in FIGURE 1, the damping mechanism being equipped with a cylindrical permanent magnet mounted on an auxiliary shaft, in the same manner as the permanent magnet shown in FIGURE 1, showing a pair of stop pins attached to the flange of a bushing fitted to the permanent magnet, the stop pins being operative to limit the angular movement of the permanent magnet.
Figure 6:
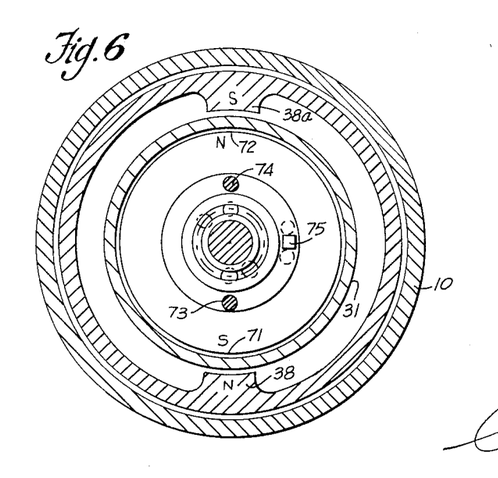
FIGURE 6 is a partial cross-sectional view and partial side elevation of the damping mechanism shown in FIGURE 5, showing the cylindrical permanent magnet, the stop pins fitted to the flange of the bushing supporting the permanent magnet, the magnet being shown moved through its maximum angular range with the stop pins in engagement with the limiting stop in dot-dash lines, taken on the line 6—6, FIGURE 5.

In a second modification of the damping mechanism, shown in FIGURES 5, 6 and 7, a permanent magnet 68 of substantially cylindrical form is substituted in place of the permanent magnet with salient poles, as shown in FIGURES 1 and 2. The cylindrical magnet 68 has a circular longitudinal bore through the center thereof, and is supported on a tubular bushing 69, which is snug fitted to the magnet 68, the bushing having a circular flange 70 integral with one end thereof to serve as an end stop for the magnet 68. The bushing 69 surrounds the auxiliary shaft 41 in the same manner as that shown in FIGURES 1 and 2, and is supported on the auxiliary shaft by a pair of ball bearings 44 and 45 in the same manner as that shown in FIGURE 1, the ends of the bushing 69 receiving the outer races of the ball bearings, with the flanges 52 and 53 of the ball bearings abutting the flanged end and the open end of the bushing respectively, as shown in FIGURE 5.

When the cylindrical magnet 68 is magnetized, a north pole 72 and a south pole 71 are formed thereon, the poles being designated by the letters N and S respectively, as shown in FIGURE 6.

When the damping mechanism is assembled, the poles 71 and 72 of the cylindrical permanent magnet are aligned with the opposite salient poles 38 and 38a of the keeper, the magnetic lines of force between the poles of the permanent magnet and those of the keeper tending to retain the permanent magnet in the position shown in FIGURE 6, with the opposite poles aligned with one another, until the permanent magnet is angularly displaced by the rotation of the motor rotor in the manner hereinbefore described for the first modification, as in FIGURES 2 and 3.

In the second modification, as shown in FIGURES 5 and 6, stop pins 73 and 74 of substantially cylindrical, or other form are pressed or otherwise inserted into the flange 70 of the bushing 69 supporting the cylindrical permanent magnet 68.

Figure 8:
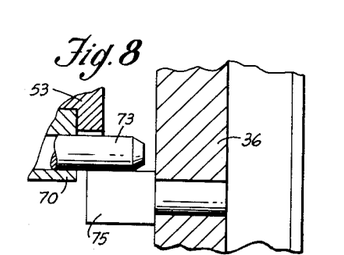
FIGURE 8 is a partial enlarged section of the construction shown in FIGURES 5 and 6, showing the bushing flange at one end of the permanent magnet, a stop pin projecting beyond the bushing flange, and a stop in engagement with the stop pin to limit the angular movement of the magnet.

As shown in FIGURES 6, 7 and 8, a stop 75 is anchored on the circular rear wall 42 that supports the keeper 35, to be in the locus of the circular path of movement of the stop pins 73 and 74, so the stop will limit the movement of the magnet 68 to the angle between the stop 75 and the position of the pins 73 and 74 when in neutral position.

As shown in FIGURE 8, the stop 75 may have a cylindrical extension integral therewith to be pressed into or otherwise attached to the rear wall 36. Where the permitted angular movement of the cylindrical magnet 68 is to be reduced, the width of the stop 75 may be increased, or a pair of stops may be substituted therefor.

FIGURE 9 shows a set of comparative curves indicating the relation between the speed and the torque of a servo motor equipped with a built-in damping action, as compared to the conventional type of servo motor, and a servo motor equipped with another type of damping mechanism.

The modified drawing shown in FIGURE 9, shows a comparison of the speed torque curve of the conventional type of servo motor, as compared to a servo motor equipped with a return path of the type provided by Wallach in Patent No. 2,770,743, as well as the modified speed torque curve of a motor built in accordance with the present invention. In the revised drawing of FIGURE 9, the outer or solid line 90 represents the speed torque relation of the conventional type of servo motor, the speed torque relation being a substantially straight line. The second curve 91, 92, shown in dash lines, shows the modified speed torque relation, of a modified servo motor fitted with a return path of the type provided by Wallach in U.S. Patent No. 2,770,743, hereinbefore described. Here the maximum speed of the motor is sharply reduced, although the maximum torque at low speed remains substantially the same as that shown in curve 90. The speed torque relation is still substantially a straight line, although the slope of the line is sharply reduced. In the construction provided by applicant, in which a return path and magnet are substantially as shown in FIGURES 1 and 2, the upper portions of the curve 91, at low speeds and high torque is substantially the same as that shown in the Wallach construction. As the speed is increased to approximately the point 93, the right-hand portion of the curve slopes outward to a curve section 94 at an angle approaching that of the curve 90, so that at zero torque and maximum speed the two curves arrive at substantially the same point. Summarizing, with the normal type of servo motor, the speed torque curve is a straight line, sloped as indicated in FIGURE 9. With the Wallach type of damping mechanism, the damping increases, as the speed increases, thus giving a curve as shown at 91, 92, in which the speed drops off sharply at no load, as contracted with the maximum speed on curve 90. This results in a high viscous velocity error. In applicants' damping mechanism construction, the damping at maximum, or no load speed is virtually zero, so that the two curves coincide at maximum speed, and the velocity error is either sharply reduced, or there is no velocity error in the system.

The manner in which the two operating curves 78 and 79 in FIGURE 9 may be obtained, and their relationship to the magnetic damping structure, may readily be understood upon reference to the structure in FIGURE 3, conveniently located adjacent FIGURE 9.

As shown in FIGURE 10, a servo loop in which a servo motor, such as that shown in FIGURE 1 could be utilized, may briefly be illustrated as including a differential device 83 arranged to receive an external command or signal force 84, which for convenience is indicated in the system as being an electrical signal, which is transmitted through the differential device 83 to a suitable amplifier 85, which then supplies operating energy to a servo motor 86 such as that shown in FIGURE 1, to operate a load 87 through a suitable reduction gear 88, to follow the instructions or directions of the input signal 84.

An auxiliary current, which is received from a servo generator 89 driven by the shaft of the servo motor, and transmitted through a conduit 90, is directed to the differential 83, the generator signal current informing the differential 83 of the output condition and position o the servo motor 86 in following the instructions of the input signal 84. The difference between the input signal 84 and the auxiliary signal from the generator 89 in the conductor 90 represents the difference, or deviation, or error signal which is isolated in the differential 83 and fed through the amplifier 85 to control the operation of the servo motor 86. The servo loop shown in FIGURE 10 is directed to a velocity or speed control servo system.

In order to enable the servo motor to follow the character and amplitude of the input signal 84 or any changes therein, it is desirable and well known in established practice to introduce a damping force on the motor rotation to limit or prevent oscillations that would otherwise result from the inertia of the rotor 17 of the motor 86, the connected reduction gear 88 and the load 87. For such damping action in this application, the motor is provided with a suitable damping mechanism, such as that shown in FIGURES 1, 2 and 3 and hereinbefore described in detail.

The damping mechanism which is enclosed in the right-hand housing 10 shown in FIGURE 1, and schematically indicated in FIGURE 10, includes a cup-shaped drag cup having a tubular outer wall 31, the drag cup being directly coupled to the drive shaft 28 of the servo motor, and a permanent magnet 40 rotatably mounted on an auxiliary shaft 41, co-axially aligned with the motor driveshaft but independent thereof, with a hollow cylindrical keeper, or return path attached to the damping mechanism housing 10 as shown in FIGURE 1, the tubular shell 35 of the keeper surrounding the drag cup outer wall 31 and the permanent magnet 40, the auxiliary shaft being supported by and fixedly attached to the end wall 36 of the keeper.

The permanent magnet 40 is freely rotatable about the auxiliary shaft axis, which is co-axial with the motor drive shaft axis, which is shown by the broken line 91 in FIGURE 10, the keeper or return path for the flux of the permanent magnet being mounted co-axially with the motor drive shaft axis 91.

The general arrangement and construction of the servo motor 86 together with the damping mechanism, as integral devices in association with the servo motor are shown in detail in FIGURES 1, 2 and 3, and in a modified form in FIGURES 5 and 6. These constructions and the operation of the damping mechanism thereof were hereinbefore described in detail.

In the prior Wallach patent, referred to above, the rotatable magnet is freely rotatable throughout the circle, and without any mechanical restraint such as the present stops. Further, in Wallach, the keeper 35 is cylindrical and does not have the salient poles 38 and 38a Wallach does achieve a desirable inverse relation between speed and restraining torque on the cup, as against his prior art.

However, the present improvement seeks to establish tighter magnetic coupling restraint in the speed range close to zero to establish more effective restraint and control against oscillation about the null position. The salient pole construction on the keeper in this invention provides several functional features. The gap flux from the magnet is held concentrated. Thus, better inductive restraint or drag damping can be established on the cup. Second, the salient keeper pole anchors one end of the gap flux field, and, consequently, movement of the permanent magnet 40 shifts the gap flux field from a radial position to a tangential position relative to the locus of the cup path. The inductive damping restraint on the cup can therefore be controlled as a function of the magnet angular shift and as a function of the dimensions of the salient poles of the magnet and of the keeper.

In order to reduce oscillation tendencies in the servo motor and its load, the maximum damping action on the cup should be available and effective as the cup speed diminishes to zero, which represents the null position corresponding to the error signal to the servo motor. In this case, such damping action is provided by the flux field across the gap, which varies from low density tangential field to high density radial field as the cup speed diminishes from high speed to low or zero speed with reduction of the error signal as the servo system approaches desired null position.

It will be apparent to those skilled in the art that the present invention is not limited to the specific details described above and shown in the drawings, and that various modifications are possible in carrying out the features of the invention and the operation, control, actuation, and method of utilization thereof, without departing from the spirit and scope of the appended claims.

What is claimed is:

1. A servo system to be controlled in accordance with an input signal, said system comprising
 a servo motor having a stator structure disposed about a longitudinal axis, a rotor, and an output shaft to supply an output driving torque;
 means responsive to the motor speed to provide an output signal as a function of the motor speed;
 means responsive to a difference between the amplitudes of the input signal and of the output signal to control the supply of driving energy to the servo motor,
 permanent magnet damping means;
 and means coupling the magnet means to the servo motor shaft to impose a viscous damping torque on the motor shaft, and operating to vary such coupling between the magnet means and the motor shaft as an inverse function of motor speed.

2. A servo system as in claim 1, in which the damping means includes a housing fixedly attached to the motor stator structure and coaxially aligned therewith;
 a magnetic keeper concentrically fixed to said housing;
 a permanent magnet rotatably supported by the housing concentrically within the keeper;
 and means fixedly attached to the motor drive shaft and operative to transmit thereto the damping force generated by inductive coupling to the permanent magnet and keeper combination.

3. A servo system as in claim 1, in which the damping means comprises a housing supported and secured co-axially on the motor structure:
 a magnetic keeper concentrically fixed within said housing and having a pair of polar faces to define mutual position;
 an auxiliary shaft supported by said housing in co-axial alignment with the motor drive shaft;
 a permanent magnet supported for free relative rotation on said auxiliary shaft, and within a limited angle on either side of a mutual position relative to said keeper;
 the magnet being radially spaced from the keeper to define an air gap between the magnet and its keeper;
 and a hollow metallic cylindrical cup supported on and secured to the motor drive shaft and extending into said air gap concentrically with the common axis to rotate in the magnetic field across said air gap.

4. A servo system as in claim 1, in which the damping means comprising a housing supported and secured co-axially on the motor structure;
 an auxiliary shaft supported by said housing in co-axial alignment with the motor drive shaft;
 a permanent magnet supported for free rotation on said auxiliary shaft, within a limited angle from neutral position;
 a substantially cylindrical hollow magnetic keeper for said magnet attached to said housing concentrically therewith and radically spaced from and encircling the magnet;
 and means supported on and secured to the motor drive shaft and movable in the magnetic field of the permanent magnet to generate an eddy current field to react against the field of the permanent magnet and thereby to establish a damping torque on the motor drive shaft.

5. A servo system as in claim 1, in which the damping means comprises a housing supported and secured co-axially on the motor structure;

an auxiliary shaft supported by the housing in co-axial alignment with the motor drive shaft;

a hollow substantially cylindrical magnetic keeper fixedly and concentrically attached to the housing, and shaped to have a pair of integral diametrically opposite poles substantially parallel to the longitudinal axis;

a permanent magnet supported for free rotation on said auxiliary shaft, the magnet having a pair of diametrically opposite poles tending to move to neutral position in radial alignment with the opposite poles of the keeper, the poles of the permanent magnet being of dimensions to be radially spacedly from the poles of the keeper by a small air gap when in neutral position;

and means supported on and secured to the motor drive shaft and movable in the magnetic field between the permanent magnet poles and the keeper poles to generate an eddy current field to react against the field of the magnet and thereby to impose a damping torque on the motor drive shaft during the rotation of said shaft.

6. A servo system as in claim 1, in which the damping means comprises a housing supported and secured co-axially on the motor structure;

an auxiliary shaft supported by the housing in co-axial alignment with the motor drive shaft;

a hollow substantially cylindrical magnetic keeper fixedly attached to the housing and disposed concentrically therein, the keeper having a pair of integral diametrically opposite poles substantially parallel to the longitudinal axis of the housing;

a permanent magnet supported for free rotation on said auxiliary shaft, the magnet having a pair of diametrically opposite poles tending to move to radial alignment with the poles of the keeper, the poles of the permanent magnet being radially spaced relative to the poles of the keeper when in alignment;

and a hollow cylinder of current-conducting material supported as a cantilever from and secured to the motor drive shaft, and said cylinder being rotatable by said motor drive shaft to rotate concentrically within the circular regions between the magnet poles and the keeper poles to establish an eddy current reaction between the cylinder of current-conducting material and the flux from the permanent magnet, thereby to impose a damping torque on the motor shaft during the rotation of said motor drive shaft.

7. A servo system comprising a load device to be actuated;

means providing an input signal to dictate the operating of said load device;

a servo motor to control said load device according to such signal, said motor having a stator, a noutput drive at one end and a reaction control shaft at the other end, means responsive to the speed of the servo motor to generate a feedback voltage signal that is a function of such motor shaft speed;

differential means responsive to the difference between the input signal and the feedback motor output shaft speed and operative to control the servo motor in accordance with such differences;

means connecting the output shaft of the motor to said load device;

and means to develop a viscous damping torque on said output shaft, said means including a permanent magnet;

a hollow substantially cylindrical magnetic keeper;

an auxiliary shaft supporting the permanent magnet for free relative rotation on said auxiliary shaft;

said magnetic keeper including poles radially spaced relative to said magnet;

and means attached to the motor drive shaft and circumferentially rotatable between the keeper and the permanent magnet to generate an eddy current in said means by linkage with the flux from the permanent magnet, to thereby impose a viscous damping torque on the motor drive shaft.

8. A servo system as in claim 7, in which the damping means is operative to impose a damping torque on the motor drive shaft substantially in inverse proportion to the speed of rotation of the motor drive shaft at low shaft speed.

9. A servo system as in claim 7, in which the damping means is operative to impose a damping torque on the motor drive shaft substantially in inverse proportion to the speed of rotation of the motor drive shaft while the speed of the motor drive shaft is relatively high.

10. A servo system as in claim 7, in which the damping means is operative to impose a damping torque on the motor drive shaft relatively inverse to the motor drive shaft speed, the rate of variation of the damping torque to low speeds of the motor shaft being relatively high, and the rate of variation of the damping torque to the speed of the motor drive shaft being relatively low at high speed of the motor drive shaft.

11. A servo motor with built-in damping, comprising a motor having a stator, a stator housing, and a rotor provided with a drive shaft on one end of the rotor and with a stub shaft at the other end of the rotor, both shafts being co-axial;

and a motor damping device including a tubular housing anchored on and fixedly attached to the stator housing as a co-axial extension thereof and extending beyond and encircling the motor stub shaft, a keeper fixedly and concentrically attached to said tubular housing, an auxiliary shaft supported by said keeper and disposed co-axially in line with the motor stub shaft, a permanent magnet supported for free relative rotation on an axis co-axial with the axis of the rotor drive shaft, a tubular bushing supported by the auxiliary shaft and in turn supporting the permanent magnet for rotation, and a cylindrical metallic drag cup extending into the region between the permanent magnet and the keeper, said drag cup having an end hub supported on and secured to the stub shaft of the motor.

12. A servo motor combination as in claim 11, in which the keeper constitutes an integral tubular section with a pair of diametrically opposite poles disposed to be substantially parallel to the axis of rotation of the permanent magnet, the permanent magnet having a pair of diametrically aligned integral poles of substantially rectangular cross-section, the poles of the permanent magnet tending to establish themselves in radial alignment with the opposite poles of the keeper.

13. A servo motor combination as in claim 11, in which the keeper has an end wall attached to the tubular housing of the damping device, and an integral tubular section with a pair of diametrically opposite poles disposed substantially parallel to the axis of rotation of the permanent magnet;

the permanent magnet having a pair of integral poles, the magnet poles being of substantially rectangular cross-section, and disposed diametrically opposite each other and tending to radially align themselves with the opposite poles of the keeper;

and including stop means fixedly attached to the end wall of the keeper to limit the angular movement of the rotatable magnet.

14. A servo motor combination as in claim 11, in which the keeper has an integral tubular section with a pair of diametrically opposite poles disposed substantially parallel to the axis of rotation of the permanent magnet, and the permanent magnet is of substantially cylindrical form and disposed concentric with the cylindrical shaft and:

having a pair of diametrically opposite poles formed thereon and tending to move to normal radial alignment with the opposite poles of the keeper.

15. A servo motor combination as in claim 11, in which the keeper consists of a substantially circular end wall and a tubular section with a pair of diametrically opposite poles integral with the tubular section, substantially parallel to the axis of rotation of the permanent magnet, means fixedly attaching the end wall of the keeper to said tubular housing, and the permanent magnet being substantially cylindrical and concentric with the auxiliary shaft, the tubular bushing being fixedly attached to the permanent magnet, having a flange integral with one end thereof, a plurality of pins fixedly attached to the bushing flange and projecting longitudinally therefrom toward the keeper end wall, and a stop member fixedly attached to the end wall of the keeper and projecting longitudinally therefrom toward the permanent magnet bushing, said stop member being radially disposed across the arcuate path of the stop pins attached to the bushing flange, to be engaged by the stop pins attached to the bushing flange to limit the angular movement of the permanent magnet.

16. A servo motor with built-in damping, comprising a motor having a stator, a stator housing, and a rotor provided with a main drive shaft at one end of the rotor and with a stub shaft at the other end of the rotor, both shafts being co-axial on the rotor;

and a motor-damping device comprising, in subcombination, a tubular housing anchored on the motor stator housing as a co-axial extension thereof, and extending beyond and encircling the stub shaft;

a hollow cylindrical keeper disposed and substantially concentric with the housing, having an integral end wall attached to the tubular housing, said keeper having a pair of longitudinally extending diametrically opposite poles thereon disposed substantially parallel to the axis of rotation of the magnet;

an auxiliary shaft supported by said keeper co-axially in line with the motor stub shaft;

a permanent magnet supported for free rotation on the auxiliary shaft, concentrically within the keeper, the permanent magnet having a pair of diametrically opposite poles thereon tending to move toward radial alignment with the poles of the keeper;

and a hollow cylindrical drag cup made of a non-magnetic metallic material and extending longitudinally between the poles of the permanent magnet and the poles of the keeper, said drag cup having an end hub supported on and secured to the stub shaft of the motor.

17. A servo motor with built-in damping comprising a motor having a stator, a stator housing, and a rotor provided with a drive shaft at one end of the rotor and with a stub shaft at the other end thereof, both shafts being co-axial;

and a motor damping device consisting of a tubular housing co-axially attached to the motor housing and extending beyond and encircling the stub shaft;

a hollow cylindrical keeper fixedly attached to the said housing substantially concentric therewith, and an auxiliary shaft supported from said housing and disposed in co-axial alignment with the motor stub shaft;

a permanent magnet supported for free rotation on the auxiliary shaft, concentrically within the keeper;

and a drag member supported on and secured to the motor stub shaft, and disposed to be movable in the magnetic field of the permanent magnet to generate a counter magnetic field in the drag member and thereby to establish a damping torque on the motor drive shaft.

18. A servo motor combination as in claim 17, in which the hollow cylindrical section of the keeper has a pair of diametrically opposite integral poles disposed substantially parallel to the axis of rotation of the permanent magnet and an end wall substantially perpendicular to the longitudinal axis thereof, the end wall being integral with one end of the hollow cylindrical section, means fixedly attaching the end wall to the tubular housing;

the permanent magnet having a pair of diametrically opposite poles tending to move toward alignment with the poles of the keeper;

a plurality of stop members fixedly attached to the end wall of the keeper and extending longitudinally therefrom in a direction parallel to the axis of rotation of the permanent magnet and directed toward the permanent magnet, said stop members serving to engage the permanent magnet to limit the angular movement of the magnet in either direction.

19. A servo motor combination as in claim 17, in which the keeper has an integral end wall, means fixedly attaching the end wall to the tubular housing;

the permanent magnet having a pair of diametrically opposite poles tending to move to radial alignment with the poles of the keeper;

the drag member being a hollow cylinder of current-conducting material, and being co-axially supported as a cantilever from and secured to the rotor stub shaft, and being rotatable by said rotor stub shaft concentrically within the keeper and adjacent the permanent magnet poles, the permanent magnet poles being operative to induce a counter magnetic field in the drag member, and the counter magnetic field in the drag member being effective to control the angular movement of the permanent magnet and thereby to impose a damping torque on the motor shaft through the drag member;

the damping torque imposed on the rotor drive shaft varying as a function of the area of the poles of the permanent magnet, the intensity of the magnetic flux between the poles of the permanent magnet and the keeper poles, and the air gap between the poles of the permanent magnet and the corresponding keeper poles.

20. A servo motor combination as in claim 17, in which the keeper has a pair of diametrically aligned poles integral therewith, substantially parallel to the axis of rotation of the permanent magnet;

the poles of the permanent magnet being radially spacedly located relative to the poles of the keeper to provide an air gap therebetween;

the drag member including a metallic hollow cylindrical section extending radially into the air gap between the poles of the keeper and the permanent magnet poles, concentrically with the common axis, the damping torque imposed on the rotor drive shaft being a function of the width of the poles of the permanent magnet, the intensity of the magnetic flux between the poles of the permanent magnet and the keeper poles, and the air gap between the poles of the permanent magnet and the corresponding keeper poles.

21. A servo motor with built-in damping comprising a motor having a stator, a stator housing and a rotor provided with a drive shaft at one end of the rotor, with a stub shaft at the other end thereof, both shafts being co-axial, and a motor damping device consisting of a tubular cup-shaped housing fixedly attached to the motor housing co-axial therewith, and extending beyond and encircling the motor stub shaft;

a hollow cylindrical keeper fixedly attached to the tubular housing of the damping device, an auxiliary shaft supported by the keeper and disposed co-axially with the rotor drive shaft;

the keeper having a pair of integral poles substantially parallel to the longitudinal damping device housing axis;

a permanent magnet supported for free rotation on the auxiliary shaft, the permanent magnet having a pair of diametrically opposite poles tending to establish alignment with the poles of the keeper, and spaced from the poles of the keeper to provide an air gap therebetween, the permanent magnet being operative to establish a magnetic field between the permanent magnet poles and the adjacent keeper poles;

and a drag cup supported on and secured to the rotor stub shaft and extending into said air gap concentrically with the common axis to rotate in the magnetic field across said air gap.

22. A servo motor with built-in damping comprising a motor having a stator, a stator housing and a rotor provided with a main drive shaft at one end of the rotor, with a stub shaft at the other end thereof, both shafts being co-axial, and a motor damping device consisting of a tubular cup-shaped housing fixedly attached to the motor housing co-axial therewith, and extending beyond and encircling the stub shaft;

a hollow cylindrical keeper fixedly attached to the tubular damping device housing, an auxiliary shaft supported by the keeper and disposed co-axially with the rotor drive shaft;

a substantially cylindrical permanent magnet supported for free rotation on the auxiliary shaft;

the keeper having a pair of diametrically aligned poles substantially parallel to the axis of rotation of the permanent magnet, the inner surface of the keeper poles being spacedly located relative to the outer circumference of the permanent magnet to provide an air gap therebetween;

the permanent magnet having a pair of poles thereon tending to establish radial alignment with the poles of the keeper, the permanent magnet being operative to establish a magnetic field between the poles of the keeper and the adjacent poles of the permanent magnet;

and a drag cup supported on and secured to the stub shaft and extending into said air gap concentrically with the common axis to rotate in the magnetic field across said air gap.

References Cited in the file of this patent
UNITED STATES PATENTS

| | | |
|---|---|---|
| 2,115,086 | Riggs | Apr. 26, 1938 |
| 2,489,689 | Wald | Nov. 29, 1949 |
| 2,770,743 | Walloch | Nov. 13, 1956 |